United States Patent
Li et al.

(10) Patent No.: US 8,754,329 B2
(45) Date of Patent: Jun. 17, 2014

(54) HIGH VOLTAGE DIRECT CURRENT CABLE TERMINATION APPARATUS

(71) Applicants: Ming Li, Vasteras (SE); Markus Saltzer, Fislisbach (CH); Uno Gafvert, Vasteras (SE); Cecilia Forssen, Vasteras (SE); Mikael Unge, Vasteras (SE)

(72) Inventors: Ming Li, Vasteras (SE); Markus Saltzer, Fislisbach (CH); Uno Gafvert, Vasteras (SE); Cecilia Forssen, Vasteras (SE); Mikael Unge, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/683,643

(22) Filed: Nov. 21, 2012

(65) Prior Publication Data

US 2013/0081851 A1 Apr. 4, 2013

Related U.S. Application Data

(63) Continuation of application No. PCT/EP2010/057065, filed on May 21, 2010.

(51) Int. Cl.
*H02G 15/00* (2006.01)
*H02G 15/22* (2006.01)
*H01B 17/42* (2006.01)
*H01T 4/14* (2006.01)

(52) U.S. Cl.
USPC ............ 174/73.1; 174/19; 174/74 R; 174/144

(58) Field of Classification Search
USPC .............. 174/19, 73.1, 140 R, 142–144, 74 R
See application file for complete search history.

(56) References Cited

U.S. PATENT DOCUMENTS

| 3,318,995 | A | * | 5/1967 | Buckley et al. | ............... 174/142 |
| 3,876,820 | A | * | 4/1975 | Mashikian | ....................... 174/19 |
| 4,296,274 | A | * | 10/1981 | Cookson | ....................... 174/142 |

(Continued)

FOREIGN PATENT DOCUMENTS

| DE | 3822288 A1 | 1/1990 |
| DE | 19845006 C1 | 4/2000 |

(Continued)

OTHER PUBLICATIONS

International Search Report & Written Opinion of the International Searching Authority Application No. PCT/EP2010/057065 Completed: Feb. 29, 2012; Mailing Date: May 29, 2012 11 pages.

*Primary Examiner* — Timothy Thompson
*Assistant Examiner* — Sherman Ng
(74) *Attorney, Agent, or Firm* — St. Onge Steward Johnston & Reens LLC

(57) ABSTRACT

A direct current cable termination apparatus for terminating a high voltage direct current cable, the apparatus includes a current-carrying device including a terminal portion of the direct current cable, the cable including an electrical conductor, a electrically insulating layer located outside of the electrical conductor, and a conductive shield located outside of the insulating layer and the electrical conductor; and a housing including a tubular outer shell with an inner periphery and formed by an electrically insulating and polymer-containing material. The current-carrying device is adapted to extend in the axial direction of the outer shell. Along at least a part of the axial extension of the current-carrying device the outer shell extends axially with a space between its inner periphery and the current-carrying device. The housing is adapted to separate the space from an atmosphere outside the outer shell, and the space is filled with an electrically insulating fluid.

29 Claims, 4 Drawing Sheets

(56) References Cited

U.S. PATENT DOCUMENTS

| | | | |
|---|---|---|---|
| 4,738,318 A | 4/1988 | Boettcher et al. | |
| 4,774,385 A * | 9/1988 | Toshima | 174/142 |
| 5,130,495 A * | 7/1992 | Thompson | 174/142 |
| 5,406,030 A * | 4/1995 | Boggs | 174/73.1 |
| 6,124,549 A | 9/2000 | Kemp et al. | |
| 6,501,024 B1 * | 12/2002 | Evans | 174/76 |
| 6,737,587 B2 * | 5/2004 | Amerpohl et al. | 174/142 |
| 7,262,367 B2 | 8/2007 | Donzel et al. | |
| 7,495,172 B2 | 2/2009 | Amerpohl | |
| 2006/0124339 A1 * | 6/2006 | Goehlich | 174/74 R |
| 2007/0272428 A1 | 11/2007 | Bayon et al. | |
| 2009/0071684 A1 | 3/2009 | Zhang | |
| 2009/0166084 A1 * | 7/2009 | Mirebeau et al. | 174/650 |

FOREIGN PATENT DOCUMENTS

| | | |
|---|---|---|
| EP | 2026438 A1 | 2/2009 |
| FR | 2518837 A1 | 6/1983 |
| JP | 2005033930 A | 2/2005 |
| WO | 2004038735 A1 | 5/2004 |
| WO | 2006015735 A1 | 2/2006 |
| WO | 2007147755 A1 | 12/2007 |
| WO | 2008119782 A1 | 10/2008 |

* cited by examiner

US 8,754,329 B2

HIGH VOLTAGE DIRECT CURRENT CABLE TERMINATION APPARATUS

FIELD OF THE INVENTION

The present invention relates to a direct current cable termination apparatus for terminating a high voltage direct current, HVDC, cable. The apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor. The apparatus comprises a housing comprising a tubular outer shell with an inner periphery, the outer shell defining a longitudinal axis and being formed by an electrically insulating and polymer-containing material, and the current-carrying device is adapted to extend in the axial direction of the outer shell. Along at least a part of the axial extension of the current-carrying device the outer shell extends axially with a space between its inner periphery and the current-carrying device, and the housing is adapted to separate the space from an atmosphere outside the outer shell, and the space is filled with an electrically insulating fluid. The outer shell has a first end portion and a second end portion. Further, the present invention relates to an electric installation comprising an apparatus of the above-mentioned kind.

BACKGROUND OF THE INVENTION

Today, the level of the rated voltage of high voltage direct current, HVDC, applications is increased in the technical field of HVDC. With this development, improved HVDC cable terminations, which can withstand higher voltage levels, are required.

A HVDC cable is used for power supply in power distribution networks and power transmission networks. Generally, the HVDC cable comprises at least an inner or central live electrical conductor, e.g. made of copper or aluminium, an electrically insulating layer which circumferentially surrounds the electrical conductor, and a conductive shield, also called outer semicon, which circumferentially surrounds the insulating layer and the electrical conductor, the conductive shield being held on ground potential. Additional layers may be provided, e.g. a so called inner semicon, which is a conductive layer circumferentially surrounding the electrical conductor and located inside of the insulating layer, and an outer cable jacket circumferentially surrounding the conductive shield.

When the HVDC cable is electrically connected to other electric equipment, the HVDC cable is terminated. When terminating a HVDC cable, measures should be taken to ensure durable and reliable electrical performance and to protect the connection between the end of the HVDC cable and the electric equipment to which the end of cable is connected. When terminating a HVDC cable, the conductive shield and the electrically insulating layer, and possibly any further present layers, are terminated, or cut off, prior to the termination of the inner electrical conductor in order to expose the electrical conductor and connect it to the electric equipment.

WO2007/1147755-A1 discloses a cable termination for terminating a HVDC cable, the termination being provided with a device for electric field control including a field grading material layer adapted to be electrically connected to a live high voltage part and electrically connected to ground potential.

US2009/0071684-A1 describes a high voltage power cable termination.

DE 198 45 006-C1 discloses an overhead cable connector especially for medium voltage, where a funnel-shaped field control electrode surrounds the termination of the outer conductive shield, or screen, of the cable.

U.S. Pat. No. 6,124,549-A describes a cable termination where a non-linear stress-control layer surrounds the terminal portion of the cable and electrically contacts the semiconductive screen of the cable and electrically contacts the high voltage side.

DE 38 22 288-A1 discloses a high voltage cable junction including an outer shell filled with the electrically insulating gas $SF_6$. The outer shell is made of metal. At the termination of the outer conductive screen or shield, a field controlling funnel is provided. At the joint of the two cables, an XLPE band and a winding formed by EPDM type material bands are provided around the cables.

U.S. Pat. No. 7,495,172-B2 describes an outdoor dry sealing end. The sealing end comprises a solid insulating body made of polymeric material. A metallic field controlling cylinder projects into the insulating body. The conductor of the cable is guided trough a metallic supporting tube located within the insulating body.

EP 2 026 438-A1 describes a cable connection device with a non-linear resistive field-grading layer. The field-grading layer is in direct contact with the end of the conductive shield, or semiconducting layer, of the cable.

WO2006/015735-A1 discloses an open-air cable sealing end for a high-voltage cable, comprising an outer shell and an electrically conducting connecting line, the outer shell extending axially with a space between its inner periphery and the connecting line, and the space is filled with an electrically insulating gas, e.g. sulphur hexafluoride, $SF_6$.

SUMMARY OF THE INVENTION

One object of the present invention is to provide an improved high voltage direct current, HVDC, cable termination, which may withstand high voltage levels. It is a further object of the present invention to improve the electric insulation properties of a HVDC cable termination. It is also an object of the present invention to improve the mechanical performances of a HVDC cable termination.

The above-mentioned objects of the present invention are attained by providing a direct current cable termination apparatus for terminating a high voltage direct current cable (a DC cable for voltages at e.g. 50 kV and above), the apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor a housing comprising a tubular outer shell with an inner periphery, the outer shell defining a longitudinal axis and being formed by an electrically insulating and polymer-containing material, the current-carrying device being adapted to extend in the axial direction of the outer shell, along at least a part of the axial extension of the current-carrying device the outer shell extends axially with a space between its inner periphery and the current-carrying device, the housing is adapted to separate the space from an atmosphere outside the outer shell, and the space is filled with an electrically insulating fluid, the outer shell has a first end portion and a second end portion, wherein the conductive shield terminates inside the outer shell, a first part of the terminal portion of the cable has the circumferential conductive shield, whereas a remainder part of the terminal portion of the cable has the conductive shield removed, the first and remainder parts being located inside the outer shell, at least one field grading material layer is positioned around the current-carrying device, and the at least one field grading material layer extends axially inside the outer shell and is electrically connected to the conductive shield of the terminal portion of the cable and electrically connectable to the electrical conductor of the terminal portion of the cable.

Generally, the first end portion of the outer shell may be adjacent to the high voltage side, e.g. an overhead line, or electric equipment to which the cable is to be connected, and the cable enters the termination apparatus via the second end portion of the outer shell.

The at least one field grading material layer may comprise one or a plurality of layers, which is/are directly, or indirectly, electrically connected, or connectable, to the conductive shield and the electrical conductor, respectively. The at least one field grading material layer may e.g. be electrically connected to the electrical conductor of the cable via the electric equipment at high voltage side. The at least one field grading material layer may be directly, or indirectly, physically connected, or connectable, to the conductive shield and the electrical conductor, respectively. The at least one field grading material layer may e.g. be connected to the conductive shield via a conducting intermediate member or layer.

A field grading material, FGM, is a material adapted to grade the electric field. Examples of so called field grading material, FGM, which can be used for the present invention are for example mentioned in WO-A1-2008/076058 and EP-A1-1 736 998. However, other suitable FGM may also be used.

The circumferential conductive shield, also called outer semicon or screen, terminates inside the outer shell and forms a termination in the form of a circumferential edge (also called semicon edge). The inventors of the present invention have identified the termination of the circumferential conductive shield, which generally is held on ground potential, as a main problem zone, where the highest electric field and electric field stress is found. By providing the at least one FGM layer, an efficient control of the electric field distribution and a reduction of the electric field stress may be attained, and the cable termination according to the present invention is more flexible and may be tailored in an efficient way to various applications. By providing the at least one FGM layer, the electric stress under impulse test voltages is geometrically graded in an efficient way. With reference to the above, an improved cable termination for high voltage is provided, which withstands higher voltage levels, and where the electric insulation properties and the mechanical performances are improved.

The insulating fluid may be in the form of a liquid, e.g. oil or gel, a gas, or a gas mixture etc.

The electrically insulating and polymer-containing material of the outer shell may comprise one polymer or a plurality of polymers. The material may be a composite, a reinforced epoxy or a resin. The polymer can be a thermoplastic polymer, e.g. polybutylene terephthalate (PBT) or polyester, or a thermosetting polymer, e.g. thermosetting resin. The outer shell may be in the form of an epoxy reinforced structure. According to an advantageous embodiment of the apparatus according to the present invention, the outer shell is formed by a polymer or a plurality of polymers. The outer shell may be provided with an outer cover of silicone, e.g. in the form of sheds, or wings.

The DC cable may comprise further layers, e.g. an outer cable jacket circumferentially surrounding the conductive shield, which is known to the skilled person and thus not discussed in more detail hereinafter.

According to an advantageous embodiment of the apparatus according to the present invention, the current-carrying device comprises a terminal portion of a High Voltage Direct Current, HVDC, cable. Generally, the conductive shield is held on ground potential.

The apparatus according to the present invention is especially advantageous for terminating DC cables for voltages above 200 kV.

According to an advantageous embodiment of the apparatus according to the present invention, the fluid comprises an electrically insulating gas. The insulating gas may be a gas mixture. Insulating gas, e.g. $SF_6$, $N_2$ or $CO_2$, is easy to handle on site, has a low weight and has an advantageous convection cooling effect. By the at least FGM layer, a reduction of the electric field stress may be attained and the risk of electrical breakdown in the electrically insulating gas is decreased, whereby a further improved efficient control of the electric field is attained. By this embodiment, an improved HVDC cable termination is provided.

According to a further advantageous embodiment of the apparatus according to the present invention, the electrically insulating gas comprises $SF_6$, i.e. sulphur hexafluoride, $CO_2$ and/or $N_2$. By this embodiment, the insulation properties and the electric field control of the HVDC cable termination are further improved, providing a further improved HVDC cable termination. The electrically insulating gas may also comprise air, e.g. compressed air.

According to another advantageous embodiment of the apparatus according to the present invention, the at least one field grading material layer is positioned around and outside of the electrically insulating layer of the terminal portion of the cable. Hereby, an improved cable termination for high voltage is provided.

According to still another advantageous embodiment of the apparatus according to the present invention, the at least one field grading material layer extends axially along at least a major part of the remainder part. By this embodiment, the electric field control is further improved.

According to yet another advantageous embodiment of the apparatus according to the present invention, the at least one field grading material layer extends axially at least along the remainder part. By this embodiment, the electric field control is further improved.

According to an advantageous embodiment of the apparatus according to the present invention, the apparatus comprises a conducting or semiconducting layer or member which is positioned around the current-carrying device and electrically connects the at least one field grading material layer to the conductive shield of the terminal portion of the cable. This may be an advantageous way to connect to the at least one FGM layer to the conductive shield, and an improved HVDC cable termination is provided.

According to a further advantageous embodiment of the apparatus according to the present invention, the at least one field grading material layer adjoins the conductive shield of the terminal portion of the cable. Advantageously, the at least one FGM layer adjoins the conductive shield all around the current-carrying device. By these embodiments an effective connection between the at least one FGM layer and the conductive shield is provided, providing an improved electric field control.

According to another advantageous embodiment of the apparatus according to the present invention, along at least a part of the axial extension of the first part of the terminal portion of the cable, the at least one field grading material layer is positioned around and outside of the conductive shield. By this embodiment, the at least one FGM layer overlaps and covers a portion of the conductive shield at termination thereof, and an effective and reliable connection between the at least one FGM layer and the conductive shield is thus provided, providing an HVDC cable termination which attains a further improved electric field control.

According to yet another advantageous embodiment of the apparatus according to the present invention, the first part of the terminal portion of the cable extends from the second end portion of the outer shell to the termination of the conductive shield and the remainder part of the terminal portion of the cable extends from the termination of the conductive shield to the first end portion of the outer shell, and the at least one field grading material layer extends to the first end portion of the outer shell. By this embodiment, the electric field control is yet further improved.

According to still another advantageous embodiment of the apparatus according to the present invention, the electrical conductor of the terminal portion of the cable is terminated outside of the outer shell. By this embodiment, the connection of the cable termination apparatus to the power system of the high voltage side, e.g. the overhead line, is facilitated.

According to a further advantageous embodiment of the apparatus according to the present invention, the current-carrying device comprises a connecting body in which the electrical conductor terminates, and the connecting body is located inside the outer shell and adapted to electrically connect the terminated electrical conductor to an electrically conducting member adapted to extend axially in the space and to form part of the current-carrying device. The connecting body may comprise connecting elements which connect the terminated electrical conductor to the conducting member and may comprise screws and a static conductive screen/shield. The conducting member may be in the form of a rod, or a tube, e.g. made of metal, such as aluminium, copper etc. Having a bare conducting member in the space of the outer shell, which is gas-filled, e.g. with $SF_6$, is of benefit to the thermal and mechanical performances of the DC cable termination.

According to another advantageous embodiment of the apparatus according to the present invention, a field control body formed by an electrically insulating and polymer-containing material is provided inside the outer shell and positioned around the current-carrying device, where the field control body extends axially along at least a part of the axial extension of the first part of the terminal portion of the cable, extends axially along at least a part of the axial extension of the at least one field grading material layer and is located outside of the conductive shield and the at least one field grading material layer, and the field control body covers the termination of the conductive shield. By this embodiment, the electric field control is further improved. The field control body may be formed from one or several elastomers, e.g. rubber, e.g. ethylene propylene diene monomer, EPDM, or silicone rubber. The elastomer material may be filled with conductive particles or powder, e.g. carbon. The relative permittivity of the field control body material may be above 10, e.g. above 20, or even above 30.

According to still another advantageous embodiment of the apparatus according to the present invention, the remainder part of the terminal portion of the cable has a first outer surface, and at least a portion of the first outer surface of the current-carrying device forms part of the at least one field grading material layer. By this embodiment, the electric field control is further improved, and a further improved HVDC cable termination is provided.

According to yet another advantageous embodiment of the apparatus according to the present invention, substantially the entire first outer surface of the remainder part forms part of the at least one field grading material layer. By this embodiment, the electric field control is further improved, and a further improved HVDC cable termination is provided.

According to still another advantageous embodiment of the apparatus according to the present invention, the at least one field grading material layer comprises a nonlinear field grading material. Advantageously, the at least one field grading material layer comprises a resistive field grading material. Advantageously, the at least one field grading material layer comprises a nonlinear resistive field grading material with a resistivity which is a function of the electric field. Alternatively, a capacitive field grading material with field dependent permittivity may be used. By these embodiments, the electric field control is further improved, and a further improved HVDC cable termination is provided.

According to an advantageous embodiment of the apparatus according to the present invention, the apparatus comprises a conductive tubular element located inside the outer shell and positioned around the terminal portion of the direct current cable, wherein the tubular element extends axially along at least a part of the axial extension of terminal portion of the cable, and where the conductive shield is terminated somewhere along the axial extension of the tubular element. By this embodiment, the electric field control is further improved, and the risk of electrical breakdown in the electrically insulating gas is further decreased, whereby a further improved HVDC cable termination is provided. The tubular element may comprise any suitable electrically conducting material, e.g. metal, such as aluminium, copper etc., or one or several conducting polymers. Advantageously, the tubular element is rigid. Advantageously, the tubular element is held on ground potential. The tubular element may be shaped in many suitable ways. According to an advantageous embodiment of the apparatus according to the present invention, the end portion of the tubular element which is closest the first end portion of the outer shell diverges from the current-carrying device. The tubular element may be support by or mounted to the housing of the apparatus, or may be supported or held in place by the current-carrying device, for example by being fitted around the terminal portion of the cable. The axial extension of the tubular element may be at least ⅕ of the axial extension of the outer shell. The axial extension of the tubular element may be less than ⅓ of the axial extension of the outer shell.

According to a further advantageous embodiment of the apparatus according to the present invention, the tubular element extends axially along the axial extension of the first part of the terminal portion of the cable. By this embodiment, the electric field control is further improved. Alternatively, the tubular element may extend axially along at least a part of the axial extension of the first part of the terminal portion of the cable.

According to another advantageous embodiment of the apparatus according to the present invention, the tubular element extends axially along at least a part of the axial extension of the remainder part of the terminal portion of the cable. By this embodiment, the electric field control is further improved, whereby a further improved HVDC cable termination is provided.

According to still another advantageous embodiment of the apparatus according to the present invention, the tubular element adjoins the conductive shield. By this embodiment, the electric field control is further improved, whereby a further improved HVDC cable termination is provided.

According to yet another advantageous embodiment of the apparatus according to the present invention, along at least a part of the axial extension of the tubular element the outer shell extends axially with a gap between its inner periphery and the tubular element. By this embodiment, the electric field control is further improved, whereby a further improved HVDC cable termination is provided.

According to an advantageous embodiment of the apparatus according to the present invention, the tubular element has an inner periphery, and in that along at least a part of the axial extension of the terminal portion of the cable the tubular element extends axially with a gap between its inner periphery and the terminal portion of the cable. Advantageously, the gap is filled with the electrically insulating fluid, especially with insulating gas. By this embodiment, the electric field control is further improved, whereby a further improved HVDC cable termination is provided.

According to a further advantageous embodiment of the apparatus according to the present invention, the tubular element is positioned with a gap between its inner periphery and the at least one field grading material layer. Advantageously, the gap is filled with the electrically insulating fluid. By this embodiment, a triple point formed by the FGM layer, the fluid/gas and the tubular element material, which is present when the tubular element adjoins the FGM layer, is avoided, and the electric field control is further improved, whereby a further improved HVDC cable termination is provided.

According to another advantageous embodiment of the apparatus according to the present invention, along at least the axial extension of the first part of the terminal portion of the cable the tubular element extends axially with a gap between its inner periphery and the terminal portion of the cable. Advantageously, the gap is filled with the electrically insulating fluid. By this embodiment, the electric field control is further improved, whereby a further improved HVDC cable termination is provided.

According to yet another advantageous embodiment of the apparatus according to the present invention, along at least a part of the axial extension of the remainder part of the terminal portion of the cable the tubular element extends axially with a gap between its inner periphery and the terminal portion of the cable. By this embodiment, the electric field control is further improved, whereby a further improved HVDC cable termination is provided.

According to still another advantageous embodiment of the apparatus according to the present invention, said gap is filled with the electrically insulating fluid. Advantageously, the gap is filled with insulating gas. By this embodiment, the electric field control is further improved, whereby a further improved HVDC cable termination is provided.

According to an advantageous embodiment of the apparatus according to the present invention, the at least one field grading material layer has a varying thickness along the axial extension of the current-carrying device. By this embodiment, one may take into account of the change in the electric field along the axial extension of the current-carrying device, and the at least one field grading material layer may be efficiently tailored to different HVDC applications, providing a further improved electric field control.

According to a further advantageous embodiment of the apparatus according to the present invention, the at least one field grading material layer is based on a tape. Hereby, the assembly of the apparatus is further facilitated, providing an improved HVDC cable termination.

According to another advantageous embodiment of the apparatus according to the present invention, the at least one field grading material layer is based on a sleeve. Hereby, the assembly of the apparatus is further facilitated, providing an improved HVDC cable termination. Alternatively, the at least one field grading material layer may be in the form of a coating or a painted layer applied to the current-carrying device.

Further, the above-mentioned objects of the present invention may be attained by providing an electric installation, comprising a high voltage direct current cable which at least comprises an electrical conductor, a circumferential insulating layer located outside of the electrical conductor, and a circumferential conductive shield located outside of the insulating layer and the electrical conductor, and comprising a direct current cable termination apparatus for terminating the cable. Positive technical effects of the electric installation according to the present invention, and its embodiments, correspond to the above-mentioned technical effects mentioned in connection with the apparatus according to the present invention, and its embodiments.

The above-mentioned embodiments and features of the direct current cable termination apparatus and the electric installation, respectively, may be combined in various possible ways providing further advantageous embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF THE INVENTION

FIGS. 1-5 schematically show embodiments of the direct current cable termination apparatus according to the present invention, for terminating a HVDC cable for high voltage (e.g. 10 kV and above, especially 50 kV and above).

Figure 1:
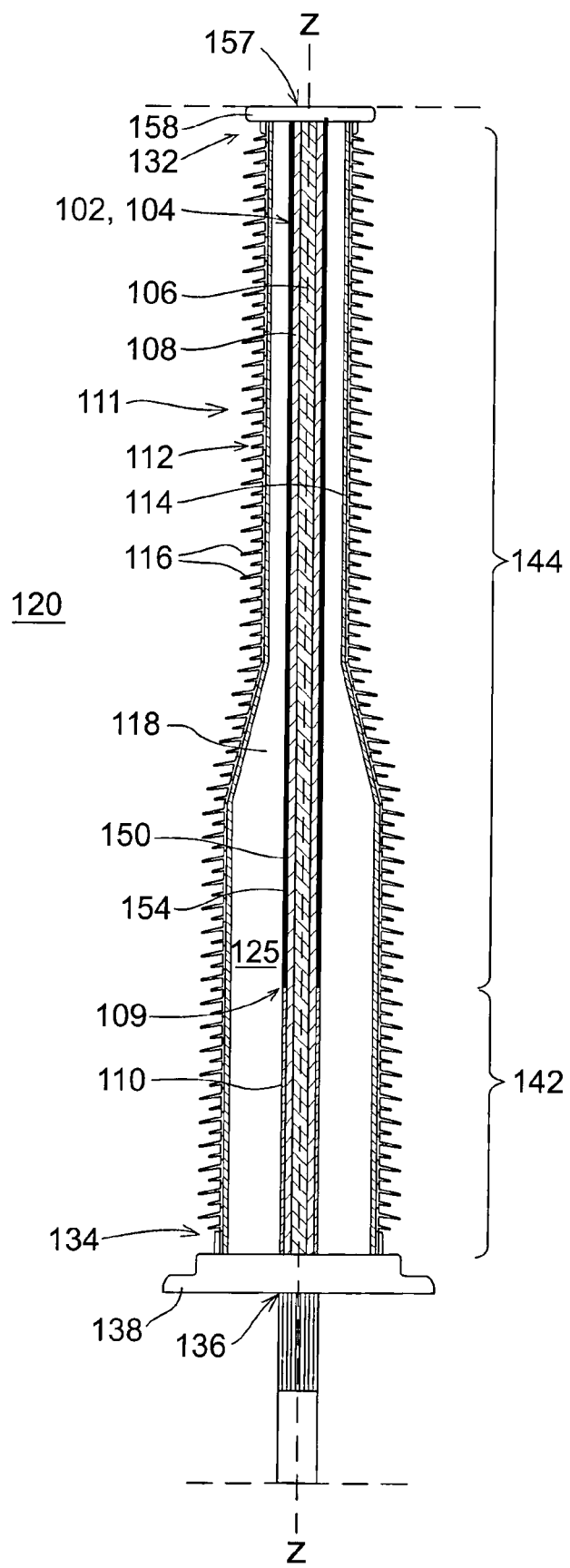
FIG. 1 is a schematic side view showing a longitudinal section of a first embodiment of the direct current cable termination apparatus according to the present invention.
Figure 2:
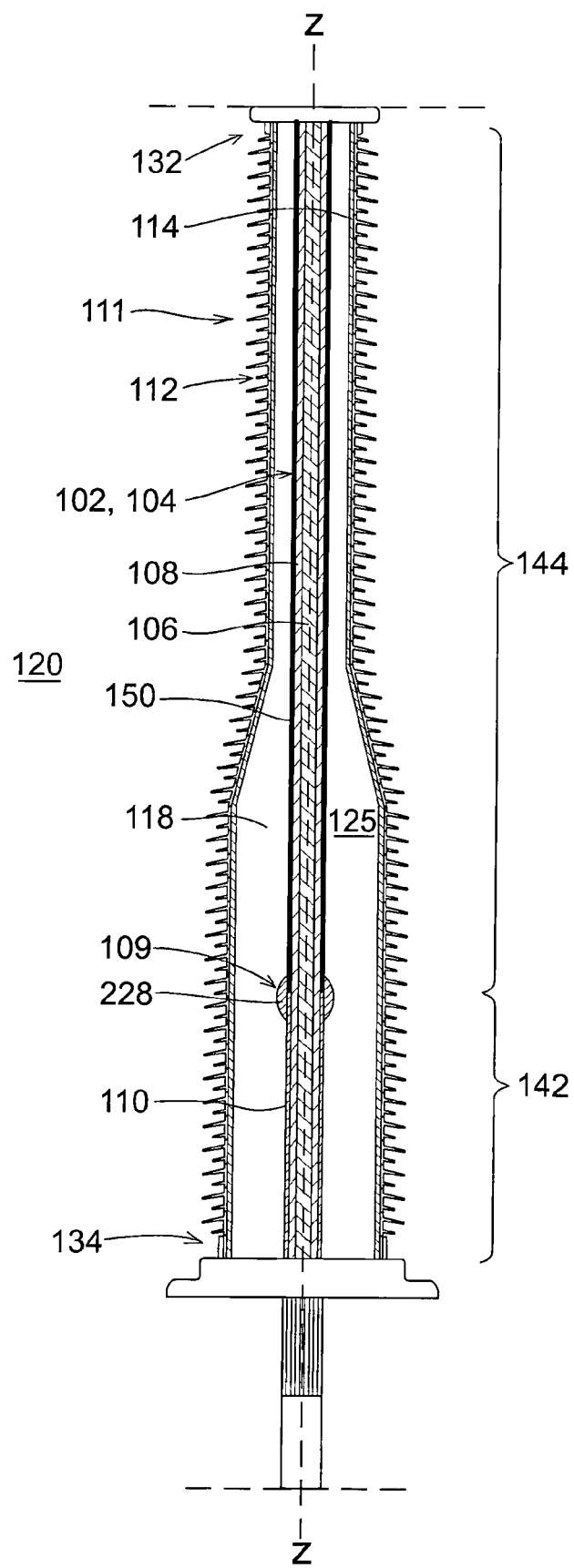
FIG. 2 is a schematic side view showing a longitudinal section of a second embodiment of the direct current cable termination apparatus according to the present invention.
Figure 3:
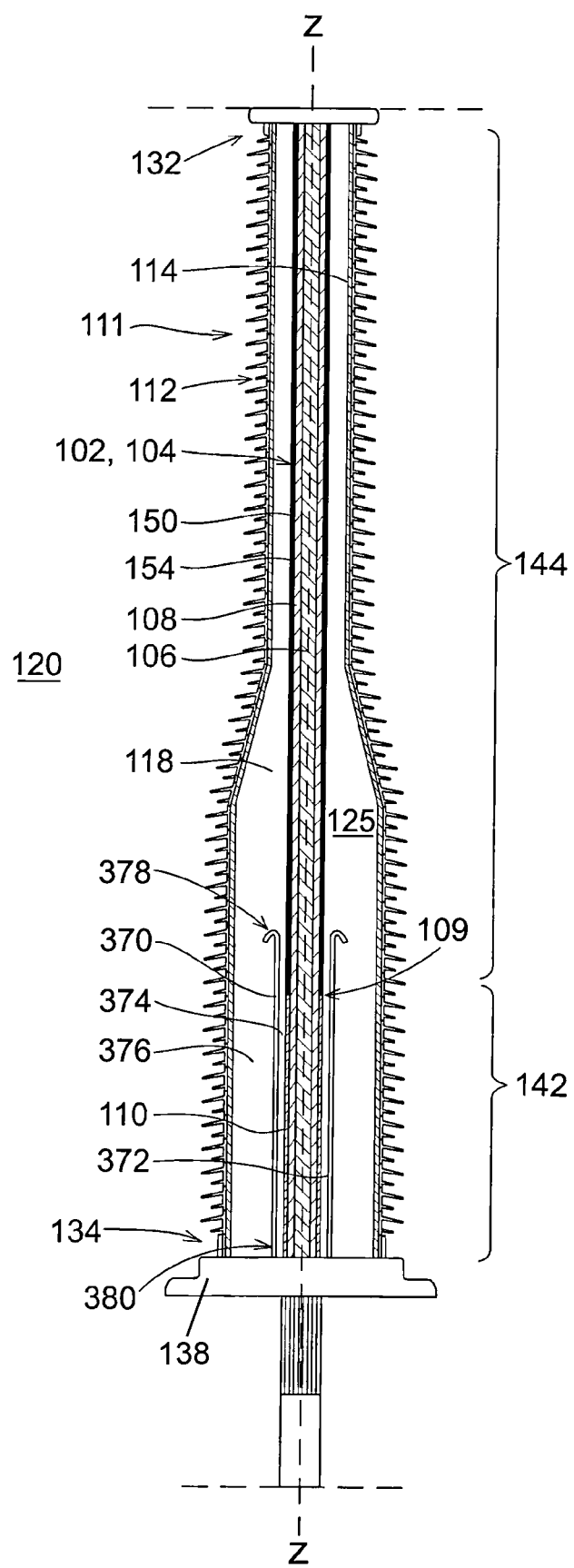
FIG. 3 is a schematic side view showing a longitudinal section of a third embodiment of the direct current cable termination apparatus according to the present invention.

Each of the embodiments shown in FIGS. 1-5 is substantially rotation symmetric around the axis z-z. In FIGS. 1-3, the structure of the apparatus is obtained by rotating the section shown 180 degrees about the axis z-z, and in FIGS. 4-5, the structure of the apparatus is obtained by rotating the section shown 360 degrees about the axis z-z.

With reference to FIGS. 1-5, each of the embodiments of the apparatus comprises a current-carrying device 102, 502, or a voltage-carrying device, comprising a terminal portion 104, 504 of the HVDC cable, the cable at least comprising a central live electrical conductor 106, 506 generally made of a suitable metal, e.g. copper or aluminium, a circumferential electrically insulating layer 108, 508 which circumferentially surrounds and is located outside of the electrical conductor 106, 506, and a circumferential conductive shield 110, 510 or layer/screen, also called outer semicon, which circumferentially surrounds and is located outside of the insulating layer 108, 508 and the electrical conductor 106, 506. The circumferential conductive shield 110, 510 may be made of an electrically conducting polymer. The structure of a HVDC cable and its parts, which may comprise further layers, is well known to the skilled person and is thus not discussed in more detail herein. The HVDC cable may e.g. comprise a so called inner semicon, which is a layer/screen circumferentially surrounding the electrical conductor and being located inside of the insulating layer. The inner semicon may be made of an electrically conducting polymer.

Further, the apparatus comprises a housing 111 which comprises a tubular outer shell 112 with an inner periphery 114. The outer shell 112 may have an axial extension of about seven metres, but other dimensions are also possible. The dimension of the outer shell 112 depends on the dimensions and structure of the DC cable, the operation conditions, such as voltage levels, and other parameters. The outer shell 112 defines a longitudinal axis z-z and is formed by an electrically insulating and polymer-containing material, e.g. a composite. The apparatus is substantially rotation symmetric around the axis z-z. The outer periphery of the outer shell 112 is provided with sheds 116, or lips/wings, for example made of silicone. The current-carrying device 102, 502 is adapted to extend in the axial direction of the outer shell 112. Along at least a part of the axial extension of the current-carrying device 102, 502 the outer shell 112 extends axially with a space 118 between its inner periphery 114 and the outer periphery of current-carrying device 102. The housing 111 is adapted to separate the space 118 from an atmosphere outside 120 the outer shell 112. The conductive shield 110, 510 terminates inside the outer shell 112.

The outer shell 112 has a first end portion 132 adjacent to the high voltage side, where the apparatus is connected to e.g. an overhead line or bus bar etc. The outer shell 112 has a second end portion 134 via which the HVDC cable enters the outer shell 112. The housing 111 may also comprise a first flange 138, e.g. made of a metal, at the second end portion 134 of the outer shell 112, and a second flange 158 at the first end portion 132 of the outer shell 112. The terminal portion 104, 504 of the cable enters the outer shell 112 via a first opening 136 defined by the first flange 138. The current-carrying device 102, 502 exits the outer shell 112 via a second opening 157 defined by the second flange 158, for connection to electric equipment of the high voltage side.

A first part 142, 542 of the terminal portion 104, 504 of the cable has the circumferential conductive shield 110, 510, whereas a remainder part 144, 544 of the terminal portion 104, 504 of the cable has the conductive shield 110, 510 removed, such that the insulating layer 108, 508 may be exposed. The first and remainder parts 142, 144, 542, 544 of the terminal portion 104, 504 of the cable are located inside the outer shell 112. The first part 142, 542 may be called semicon end, and the remainder part 144, 544 may be called stripped cable.

The apparatus comprises at least one circumferential field grading material layer, FGM, 150, 550 positioned around the current-carrying device 102, 502 more precisely in this embodiment, around the remainder part 144, 544 of the terminal portion 104, 504 of the cable which has the conductive shield 110, 510 removed. Thus, the at least one FGM layer 150, 550 is positioned around and outside of the electrically insulating layer 108, 508 of the terminal portion 104, 504 of the cable. The at least one FGM layer 150, 550 extends axially inside the outer shell 112 and extends axially at least along the remainder part 144, 544 of the terminal portion 104, 504 of the cable. The remainder part 144, 544 of the terminal portion 104, 504 of the cable has a first outer surface 154, 554, and substantially the entire first outer surface 154, 554 of the remainder part 144, 544 may form part of the at least one FGM layer 150, 550. The at least one FGM layer 150, 550 is electrically connected to the conductive shield 110, 510 of the terminal portion 104, 504 of the cable. The at least one FGM layer 150, 550 is indirectly electrically connectable to the electrical conductor 106, 506 of the terminal portion 104, 504 of the cable.

The at least one FGM layer 150, 550 is herein made of a non-linear FGM, e.g. a resistive field grading material with a field dependent electrical resistivity, e.g. in the form of a SiC or ZnO filler in a suitable polymer base. The FGM layer 150 has a varying thickness along the axial extension of the current-carrying device 102, 502. Reference is made to WO-A1-2008/076058 and EP-A1-1 736 998 for examples of FGM which may used. However, other suitable FGM may also be used. The FGM layer, or FGM layers, may be applied to the apparatus in various ways, e.g. in the form of a tape wound around the current-carrying device 102, 502 in the form of a sleeve positioned around the current-carrying device 102, 502 or in the form a coating or a painted layer applied to the current-carrying device 102, 502. The at least one FGM layer 150, 550 may have a varying thickness along the axial extension of the current-carrying device 102, 502.

The space 118 of the embodiments may be filled with an electrically insulating fluid 125 in the form of an electrically insulating gas, e.g. $SF_6$ or $N_2$, or a mixture thereof. However, other gases or fluids may be used.

Each of the embodiments shown in FIGS. 1-4 has a FGM layer 150 which all around the terminal portion 104 of the cable adjoins the conductive shield 110. Along at least a part of the axial extension of the first part 142 of the terminal portion 104 of the cable, the at least one FGM layer 150 is positioned around and outside of the conductive shield 110. Consequently, the FGM layer 150 overlaps a portion of the conductive shield 110. When the axial extension of the outer shell 112 is about seven metres, the at least one FGM layer 150 may be positioned around the conductive shield 110 along about 5 cm of the axial extension of the first part 142 of the terminal portion 104 of the cable. The conductive shield 110 is terminated and forms a termination 109 in the form of a circumferential edge (also called semicon edge). The first part 142 of the terminal portion 104 of the cable extends from the second end portion 134 of the outer shell 112 to the termination 109 of the conductive shield 110, and the remainder part 144 of the terminal portion 104 of the cable extends from the termination 109 of the conductive shield 110 to the first end portion 132 of the outer shell 112. The at least one FGM layer 150 extends from the termination 109 of the conductive shield 110 to the first end portion 132 of the outer shell 112. The electrical conductor 106 and the electrically insulating layer 108 of the terminal portion 104 of the cable are terminated outside 120 of the outer shell 112. In the embodiments disclosed in FIGS. 1-4, the FGM layer 150 may be electrically connected, indirectly or directly, to the electrical conductor 106 outside 120 of the outer shell 112 by conventional connection means.

The second embodiment shown in FIG. 2 comprises a field control body 228 formed by an electrically insulating and polymer-containing material, provided inside the outer shell 112 and positioned around the current-carrying device 102. The field control body 228 extends axially along at least a part of the axial extension of the first part 142 of the terminal portion 104 of the cable, extends axially along at least a part of the axial extension of the at least one FGM layer 150 and is located outside of the conductive shield 110 and the at least one FGM layer 150. The field control body 228 covers the termination 109 of the conductive shield 110. The field control body 228 may be shaped in various ways, and may be formed by one or several elastomers. The elastomer material may be filled with conductive particles or powder, e.g. carbon. The relative permittivity of the field control body material may be above 30.

Figure 5:
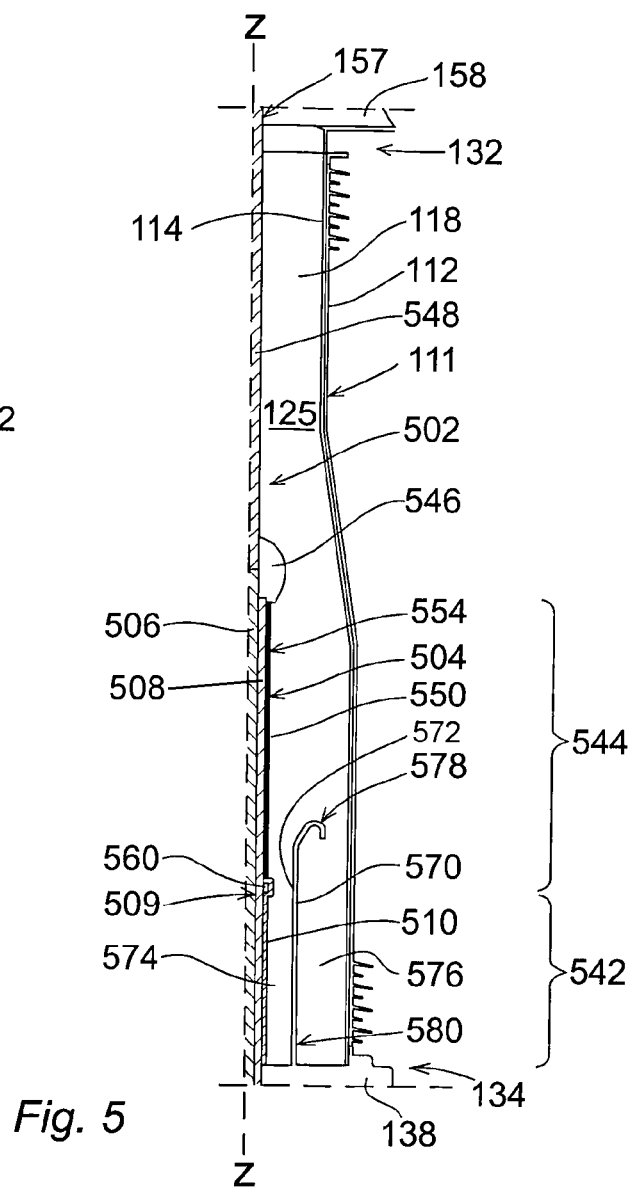
FIG. 5 is a schematic side view showing a longitudinal section of a fifth embodiment of the direct current cable termination apparatus according to the present invention.

The fifth embodiment shown in FIG. 5 includes a current-carrying device 502 which comprises a connecting body 546 located inside the outer shell 112. Both the electrical conductor 506 and the insulating layer 508 terminate in the connecting body 546. The connecting body 546 is adapted to electrically connect the terminated electrical conductor 506 to an electrically conducting member 548, e.g. in the form of a rod, adapted to extend axially in the space 118 and to form part of the current-carrying device 102. The conducting member 548 may extend to the outside of the outer shell 112 and may exit the outer shell 112 via the second opening 157 defined by the second flange 158. After the exit from the outer shell 112, the conducting member 548 may be electrically connected to electric equipment of the high voltage side in conventional ways known to person skilled in the art. Alternatively, the conducting member 548 may be connected to the electric equipment of the high voltage side via the second flange 158, e.g. without exiting the outer shell. The FGM layer 550 may be electrically connected to the electrical conductor 506 via the connecting body 546. Further, the fifth embodiment shown in FIG. 5 comprises a conducting or semiconducting layer 560 or member 560 which is positioned around the current-carrying device 502 and electrically connects the at least one FGM layer 550 to the conductive shield 510 of the terminal portion 504 of the cable. The conductive shield 510 is terminated and forms a termination 509 in the form of a circumferential edge (also called semicon edge). The first part 542 of the terminal portion 504 of the cable extends from the second end portion 134 of the outer shell 112 to the termination 509 of the conductive shield 110, and the remainder part 544 of the terminal portion 504 of the cable extends from the termination 509 of the conductive shield 510 to the connecting body 546. The at least one FGM layer 550 extends from the conducting or semiconducting layer 560 or member 560 to the connecting body 546. When the axial extension of the outer shell 112 is about seven metres, the axial distance between the connecting body 546 and the termination 509 of the conductive shield 110 may be at least about 1 metre, e.g. 1-2 metres. The axial distance from the connecting body 546 to the first end portion 132 of outer shell 112 and the axial distance from the connecting body 546 to the second end portion 134 of outer shell 112 may be substantially equal. However, other dimensions are possible.

Figure 4:
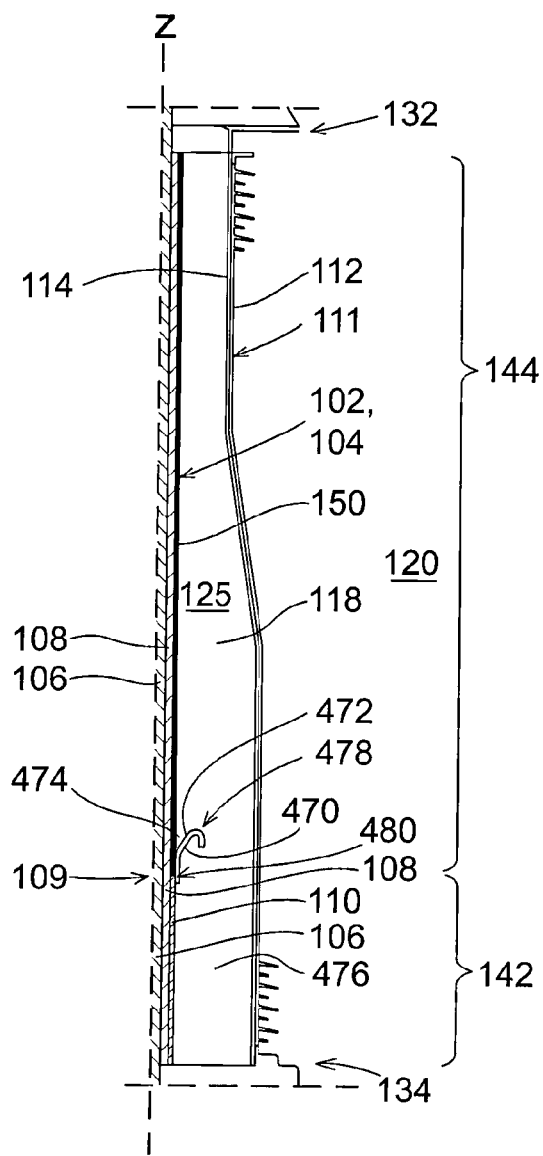
FIG. 4 is a schematic side view showing a longitudinal section of a fourth embodiment of the direct current cable termination apparatus according to the present invention.

With reference to FIG. 3-5, each of the embodiments of the apparatus shown in FIGS. 3-5 comprises a rigid conductive tubular element 370, 470, 570, e.g. made of metal, located inside the outer shell 112 and positioned around the terminal portion 104, 504 of the direct current cable. The tubular element 370, 470, 570 extends axially along at least a part of the axial extension of terminal portion 104, 504 of the cable, and the conductive shield 110, 510 is terminated somewhere along the axial extension of the tubular element 370, 470, 570. The tubular element 370, 470, 570 has an inner periphery 372, 472, 572, and along at least a part of the axial extension of the terminal portion 104, 504 of the cable the tubular element 370, 470, 570 extends axially with a gap 374, 474, 574 between its inner periphery 372, 472, 572 and the terminal portion 104, 504 of the cable. The tubular element 370, 470, 570 extends axially along at least a part of the axial extension of the remainder part 144, 544 of the terminal portion 104, 504 of the cable. Along the axial extension of the tubular element 370, 470, 570 the outer shell 112 extends axially with a gap 376, 476, 576 between its inner periphery 114 and the tubular element 370, 470, 570. The tubular element 370, 470, 570 is generally held on ground potential. Herein, the conductive tubular element 370, 470, 570 is in the form of a funnel-shaped element, but the tubular element 370, 470, 570 may be shaped in many various ways. The tubular element 370, 470, 570 has a first end portion 378, 478, 578 and a second end portion 380, 480, 580, the first end portion 378, 478, 578 of the tubular element being located closer to the first end portion 132 of the outer shell 112 in relation to the second end portion 380, 480, 580 of the tubular element. The first end portion 378, 478, 578 of the tubular element may diverge from the current-carrying device 102, 502, which provides an improved electric field control.

In the fourth embodiment of the apparatus shown in FIG. 4, the tubular element 470 adjoins the conductive shield 110 and is fitted around the terminal portion 104 of the cable. The tubular element 470 may extend axially along a part of the axial extension of the first part 142 of the terminal portion 104 of the cable, and thus axially overlap a portion of the conductive shield 110. Alternatively, the tubular element 470 may extend axially along the entire axial extension of the first part 142 of the terminal portion 104 of the cable.

In the third and fifth embodiments of the apparatus shown in FIGS. 3 and 5, the tubular element 370, 570 is mounted to and supported by the first flange 138 of the housing 111, for example by being fitted into a groove of the first flange 138. However, the tubular element 370, 570 may be supported in other ways. The tubular element 370, 570 is positioned with a gap 374, 574 between its inner periphery and the at least one FGM layer 150, 550. The tubular element 370, 570 extends axially along the axial extension of the first part 142, 542 of the terminal portion 104, 504 of the cable. Along at least the axial extension of the first part 142, 542 of the terminal portion 104, 504 of the cable, the tubular element 370, 570 extends axially with a gap 374, 574 between its inner periphery 372, 572 and the terminal portion 104, 504 of the cable. When the axial extension of the outer shell 112 is about seven metres, the gap 374, 574 between the terminal portion 104, 504 of the cable and the inner periphery 372, 572 of the tubular element 370, 570 may be about 5-10 cm, but the precise distance depends on various parameters, e.g. fluid/gas pressure, voltage levels etc. Along at least a part of the axial extension of the remainder part 144, 544 of the terminal portion 104, 504 of the cable, the tubular element 370, 570 extends axially with a gap 374, 574 between its inner periphery 372, 572 and the terminal portion 104, 504 of the cable.

The above-mentioned gaps 374, 474, 574, 376, 476, 576 are filled with the above-mentioned electrically insulating gas which fills the space 118.

The invention shall not be considered limited to the embodiments illustrated, but can be modified and altered in many ways by one skilled in the art, without departing from the scope of the appended claims. For example, the disclosed embodiments may be combined in various possible ways.

What is claimed is:

1. A direct current cable termination apparatus for terminating a high voltage direct current cable, the apparatus comprises
a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor,
a housing comprising a tubular outer shell with an inner periphery, the outer shell defining a longitudinal axis and being formed by an electrically insulating and polymer-containing material,
the current-carrying device being adapted to extend in the axial direction of the outer shell,
along at least a part of the axial extension of the current-carrying device the outer she extends axially with a space between its inner periphery and the current-carrying device,
the housing is adapted to separate the space from an atmosphere outside the outer shell, and the space is filled with an electrically insulating fluid,
the outer shell has a first end portion and a second end portion, characterized in that
the conductive shield terminates inside the outer shell,
in that a first part of the terminal portion of the cable has the circumferential conductive shield, whereas a remainder part of the terminal portion of the cable has the conductive shield removed, the first and remainder parts being located inside the outer shell,
in that at least one field grading material layer, comprising a non-linear resistive material, is positioned around the current-carrying device, and
in that the at least one field grading material layer, comprising a non-linear resistive material, extends axially inside the outer she and is electrically connected, indirectly or direct,
to the conductive shield of the terminal portion of the cable and electrically connected, indirectly or directly, to the electrical conductor of the terminal portion of the cable.

2. The direct current cable termination apparatus according to claim 1, characterized in that the fluid comprises an electrically insulating gas.

3. The direct current cable termination apparatus according to claim 2, characterized in that the gas comprises $SF_6$, $CO_2$ and/or $N_2$.

4. The direct current cable termination apparatus according to claim 1, characterized in that the at least one field grading material layer, comprising a non-linear resistive material, is positioned around and outside of the electrically insulating layer of the terminal portion of the cable.

5. The direct current cable termination apparatus according to claim 1, characterized in that the apparatus comprises a conducting or semiconducting layer or member which is positioned around the current-carrying device and electrically connects the at least one field grading material layer, comprising a non-linear resistive material, to the conductive shield of the terminal portion of the cable.

6. The direct current cable termination apparatus according to claim 1, characterized in that the at least one field grading material layer, comprising a non-linear resistive material, adjoins the conductive shield of the terminal portion of the cable.

7. The direct current cable termination apparatus according to claim 6, characterized in that along at least a part of the axial extension of the first part of the terminal portion of the cable, the at least one field grading material layer, comprising a non-linear resistive material, is positioned around and outside of the conductive shield.

8. The direct current cable termination apparatus according to claim 1, characterized in that the first part of the terminal portion of the cable extends from the second end portion of the outer she to the termination of the conductive shield and the remainder part of the terminal portion of the cable extends from the termination of the conductive shield to the first end portion of the outer shell, and in that the at least one field grading material layer, comprising a non-linear resistive material, extends to the first end portion of the outer shell.

9. The direct current cable termination apparatus according to claim 1, characterized in that a field control body formed by an electrically insulating and polymer-containing material is provided inside the outer shell and positioned around the current-carrying device, in that the field control body extends axially along at least a part of the axial extension of the first part of the terminal portion of the cable, extends axially along at least a part of the axial extension of the at least one field grading material layer, comprising a non-linear resistive material, and is located outside of the conductive shield and the at least one field grading material layer, comprising a non-linear resistive material, and in that the field control body covers the termination of the conductive shield.

10. The direct current cable termination apparatus according to claim 1, characterized in that the remainder part of the terminal portion of the cable has a first outer surface, and in that at least a portion of the first outer surface of the current-carrying device forms part of the at least one field grading material layer, comprising a non-linear resistive material.

11. The direct current cable termination apparatus according to claim 10, characterized in that substantially the entire first outer surface of the remainder part forms part of the at least one field grading material layer, comprising a non-linear resistive material.

12. The direct current cable termination apparatus according to claim 1, characterized in that the at least one field grading material layer, comprising a non-linear resistive material, comprises a nonlinear resistive field grading material with a resistivity which is a function of the electric field.

13. The direct current cable termination apparatus according to claim 1, characterized in that the apparatus comprises a conductive tubular element located inside the outer she and positioned around the terminal portion of the direct current cable, in that the tubular element extends axially along at least a part of the axial extension of terminal portion of the cable, and in that the conductive shield is terminated somewhere along the axial extension of the tubular element.

14. The direct current cable termination apparatus according to claim 13, characterized in that the tubular element extends axially along the axial extension of the first part of the terminal portion of the cable.

15. The direct current cable termination apparatus according to claim 13, characterized in that the tubular element extends axially along at least a part of the axial extension of the remainder part of the terminal portion of the cable.

16. The direct current cable termination apparatus according to claim 13, characterized in that the tubular element adjoins the conductive shield.

17. The direct current cable termination apparatus according to claim 13, characterized in that along at least a part of the axial extension of the tubular element the outer she extends axially with a gap between its inner periphery and the tubular element.

18. The direct current cable termination apparatus according to claim 13, characterized in that the tubular element has an inner periphery, and in that along at least a part of the axial extension of the terminal portion of the cable the tubular element extends axially with a gap between its inner periphery and the terminal portion of the cable.

19. The direct current cable termination apparatus according to claim 18, characterized in that the tubular element is positioned with a gap between its inner periphery and the at least one field grading material layer, comprising a non-linear resistive material.

20. The direct current cable termination apparatus according to claim 18, characterized in that along at least the axial extension of the first part of the terminal portion of the cable the tubular element extends axially with a gap between its inner periphery and the terminal portion of the cable.

21. The direct current cable termination apparatus according to claim 18, characterized in that along at least a part of the axial extension of the remainder part of the terminal portion of the cable the tubular element extends axially with a gap between its inner periphery and the terminal portion of the cable.

22. The direct current cable termination apparatus according to claim 17, characterized in that the gap is filled with the electrically insulating fluid.

23. The direct current cable termination apparatus according to claim 1, characterized in that the at least one field grading material layer, comprising a non-linear resistive material, has a varying thickness along the axial extension of the current-carrying device.

24. The direct current cable termination apparatus according to claim 1, characterized in that the at least one field grading material layer, comprising a non-linear resistive material, is based on a tape.

25. The direct current cable termination apparatus according to claim 1, characterized in that the at least one field grading material layer, comprising a non-linear resistive material, is based on a sleeve.

26. An electric installation, comprising a high voltage direct current cable which at least comprises an electrical conductor, a circumferential insulating layer located outside of the electrical conductor, and a circumferential conductive shield located outside of the insulating layer and the electrical conductor, and comprising the direct current cable termination apparatus for terminating the cable, according to claim 1.

27. The direct current cable termination apparatus according to claim 1, characterized in that the at least one field grading material layer, comprising a non-linear resistive material, extends axially along at least a major part of the remainder part.

28. The direct current cable termination apparatus according to claim 27, characterized in that the at least one field grading material layer, comprising a non-linear resistive material, extends axially at least along the remainder part.

29. The direct current cable termination apparatus according to claim 1, characterized in that the electrically insulating layer of the terminal portion of the cable is terminated outside of the outer shell.

* * * * *